(12) United States Patent
Bogard

(10) Patent No.: US 6,757,365 B1
(45) Date of Patent: Jun. 29, 2004

(54) INSTANT MESSAGING VIA TELEPHONE INTERFACES

(75) Inventor: Travis A. Bogard, San Francisco, CA (US)

(73) Assignee: Tellme Networks, Inc., Mountain View, CA (US)

( * ) Notice: Subject to any disclaimer, the term of this patent is extended or adjusted under 35 U.S.C. 154(b) by 213 days.

(21) Appl. No.: 09/691,606

(22) Filed: Oct. 16, 2000

(51) Int. Cl.[7] .............................................. H04M 1/64
(52) U.S. Cl. ................................. 379/88.17; 704/270.1; 709/206
(58) Field of Search .......................... 379/88.13, 88.01, 379/88.04, 88.14, 88.16, 88.22, 67.1, 265.01; 704/270.1; 709/206

(56) References Cited

U.S. PATENT DOCUMENTS

| | | | | |
|---|---|---|---|---|
| 5,721,763 A | * | 2/1998 | Joseph et al. ............ | 379/88.04 |
| 5,799,063 A | | 8/1998 | Krane | |
| 6,301,609 B1 | * | 10/2001 | Aravamudan et al. ...... | 709/206 |
| 6,324,569 B1 | * | 11/2001 | Ogilvie et al. .............. | 709/206 |
| 6,377,944 B1 | * | 4/2002 | Busey et al. ........... | 379/265.01 |
| 6,405,035 B1 | * | 6/2002 | Singh ......................... | 455/414 |
| 6,424,647 B1 | * | 7/2002 | Ng et al. ................... | 370/352 |
| 6,424,945 B1 | * | 7/2002 | Sorsa ....................... | 704/270.1 |
| 6,430,602 B1 | * | 8/2002 | Kay et al. .................. | 709/206 |
| 6,430,604 B1 | * | 8/2002 | Ogle et al. ................. | 709/207 |
| 6,463,142 B1 | * | 10/2002 | Kilp ........................ | 379/88.11 |

OTHER PUBLICATIONS

Diament et al. Method an apparatus for telephony–enabled instant messaging Jun. 13, 2002.*
Diament et al., Method and Apparatus for Telephony–enabled Instant Messaging Jun. 13, 2002.*
Myers, Telephone Based Access to Intant Messaging, May 17, 2001.*

* cited by examiner

*Primary Examiner*—Fan Tsang
*Assistant Examiner*—Gerald Gauthier
(74) *Attorney, Agent, or Firm*—Bever, Hoffman & Harms, LLP; Jeanette S. Harms

(57) ABSTRACT

A method and apparatus for enabling users of a phone based speech activated system such as a voice portal to communicate with users of an Internet based instant messenger (IM) service is described. Phone based users are able to send and receive IMs. Incoming messages can cause an asynchronous notification in the user's current voice application and the user can (if they desire) switch contexts to hear the IM and respond. Sent messages may be expeditiously sent to users of the GUI as a hypertext link to a recorded audio. Other sending formats are also possible; similarly, buddy lists can be supported.

7 Claims, 5 Drawing Sheets

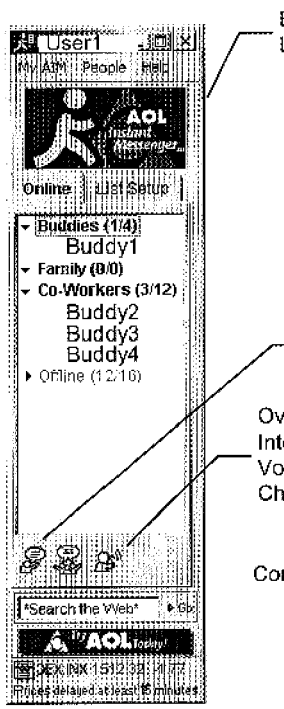
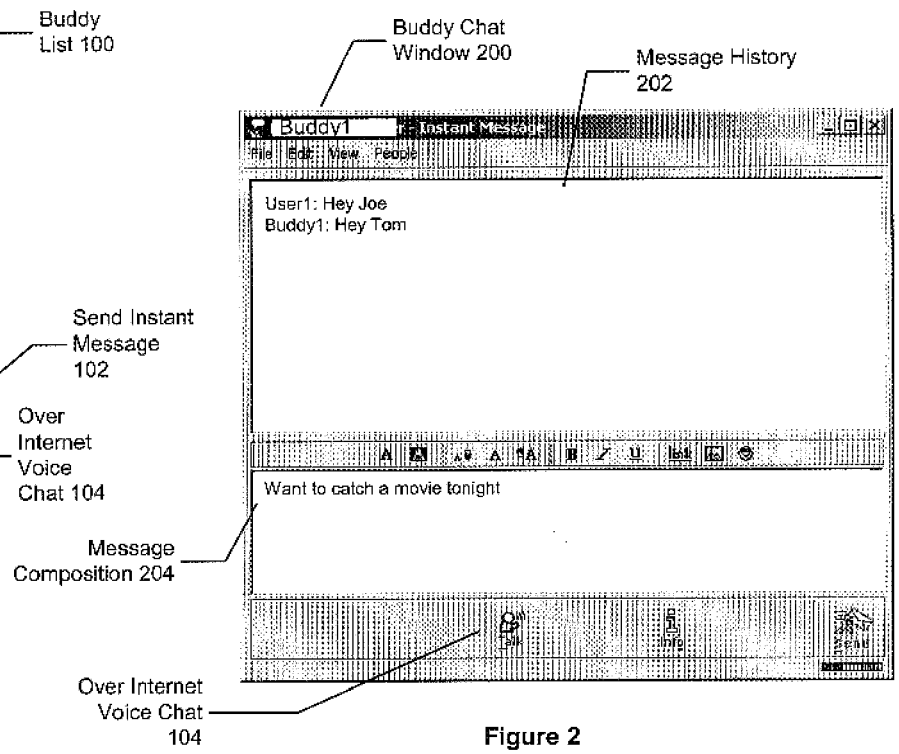
**Figure 1
(Prior Art)**
**Figure 2
(Prior Art)**

Query IM Server for Information, etc...

Retrieving Stored Messages...

INSTANT MESSAGING VIA TELEPHONE INTERFACES

BACKGROUND OF THE INVENTION

1. Field of the Invention

This invention relates to the field of information services. In particular, the invention relates to technologies for improving voice-based access to instant messaging services over a telephone interface.

2. Description of the Related Art

Instant Messaging services such as the popular ICQ(™) and AOL INSTANT MESSANGER(™), also referred to as AIM, both operated by America Online, Inc., Dulles, Va. (AOL), have risen in popularity in the last few years and shown explosive growth. Older protocols and services such as Internet Relay Chat (IRC), see RFC 1459, and the even older talk program (primarily found on UNIX(™)-type computers) have quickly been eclipsed. Competitors to AOL such as Microsoft Corporation, Redmond, Wash., and Yahoo!, Inc., Santa Clara, Calif., have introduced competing instant messenger products that operate in a similar overall fashion to AIM which shall be used as a reference herein.

Turning to prior art FIGS. 1–2, exemplary screenshots from AIM operating under the Windows(™) operating system are shown. FIG. 1 shows the buddy list 100. The buddy list 100 allows a user of AIM to see which buddies (other users of interest to our particular user, e.g. friends, co-workers, family members) are signed on, e.g. Buddy1, Buddy2, Buddy3, and Buddy4 in this example. When the user desires to instant message, or IM, with a buddy, she simply clicks on the send instant message button 102 and a window such as the buddy chat window 200 of FIG. 2 appears. The buddy chat window 200 allows a user to see a message history 202 of previous messages in an IM session and compose additional messages in the message composition areas 204.

Additionally, if both users have sufficient computer equipment, e.g. microphones, speakers, fast enough Internet connections, etc., the newer versions of the AIM client software allow computer-to-computer voice communications over the packet switched Internet backbone, e.g. by clicking on the over Internet voice chat button 104. Clicking on the button will bring up a window for monitoring performance and, in half duplex mode, controlling who speaks when.

Previous IM systems do not provide a mechanism for allowing users of a basic telephone (or wireless telephone) to send and receive instant messages. Further, the existing systems are not adapted to handle voice only users, e.g. users who do not have a graphical user interface (GUI) for reviewing buddy lists and sending/receiving text messages.

On the telephone side, several types of "party lines" have been offered, frequently of the pay variety (900 number in the United States). However, these services have never been integrated with an IM service and further these services do not have an "appearance"/"buddy" concept to allow specific users to contact each other. Rather, they are simply large conference calls.

Lastly, previous systems have not allowed two telephone users to be connected by way of a computer based identity such as an instant message appearance.

Accordingly, what is needed is a method and apparatus for allowing users with telephones to access IM services. The system should support a number of features that allow users of the traditional computer based IM service to be notified when a buddy is signed in by way of the phone and message that buddy, and vice versa. Similarly, communication between phone based users by way of the IM service should be supported.

SUMMARY OF THE INVENTION

A method and apparatus for enabling users of a phone based speech activated system such as a voice portal to communicate with users of an Internet based instant messenger (IM) service is described. Phone based users are able to send and receive IMs. Incoming messages can cause an asynchronous notification in the user's current voice application and the user can (if they desire) switch contexts to hear the IM and respond.

Sent messages may be expeditiously sent to users of the GUI as a hypertext link to a recorded audio. Other formats may include textual representations of speech, e.g. through the results of speech recognition as well as initiation of a voice communication in the format of the IM protocol. Buddy lists can be provided, e.g. phone based users can indicate those users they want to know the online/offline status for. The buddy list might be presented verbally.

Notably, the IM functionality changes the general

BRIEF DESCRIPTION OF THE FIGURES

FIG. 1 illustrates a prior art graphical user interface based buddy list.

FIG. 2 illustrates a prior art graphical user interface based buddy chat.

DETAILED DESCRIPTION

A. Introduction

Figure 3:
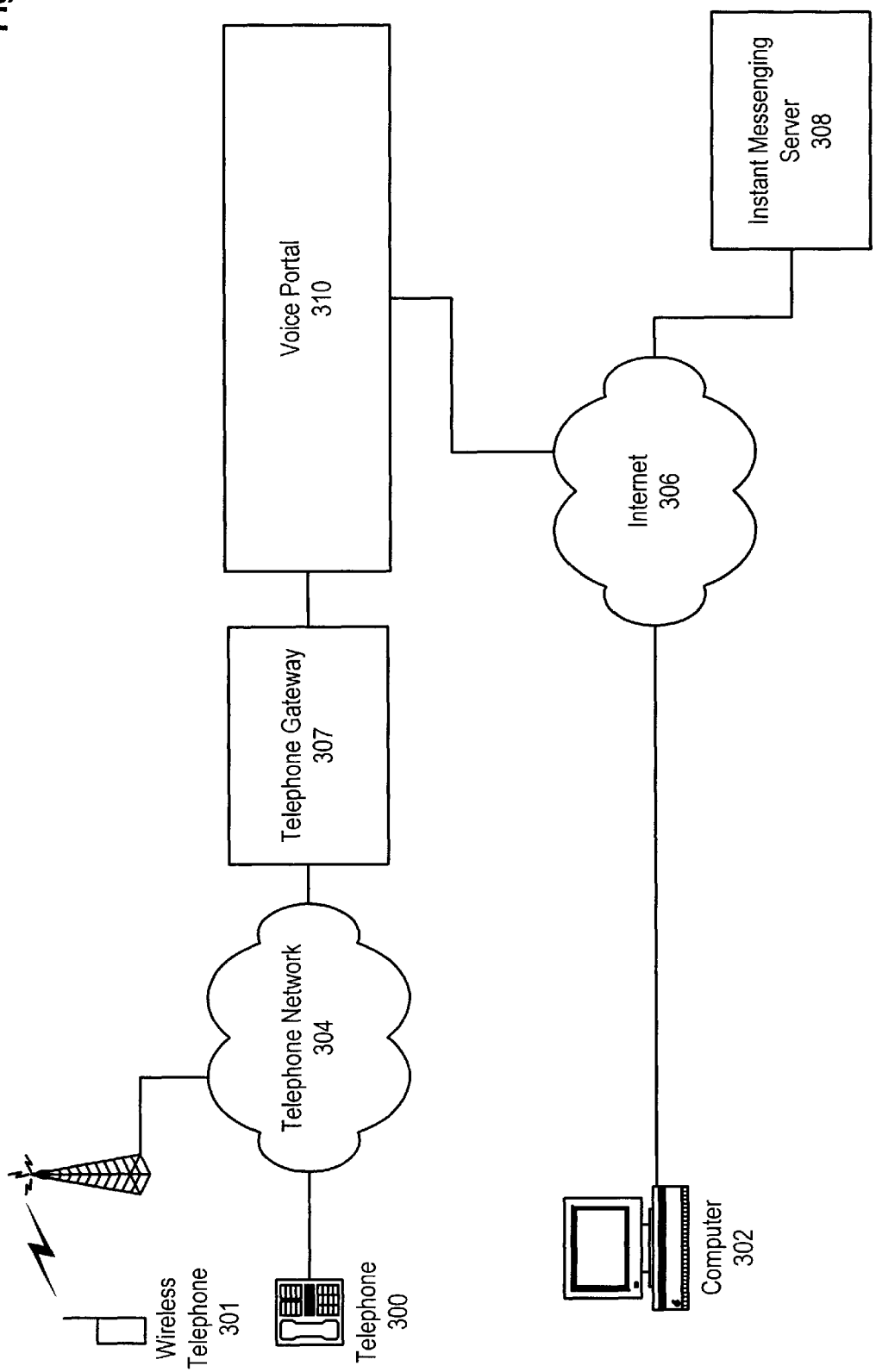
FIG. 3 illustrates a system including embodiments of the invention used to provide instant messaging service to users of telephones.

A voice portal supporting electronic commerce over a telephone interface is described. The voice portal allows users of telephones, including wireless telephones, to access a voice portal by dialing a phone number to purchase goods and services, interact with applications, and access IM services. The information provided over the voice portal may come from the World Wide Web (WWW), databases, third parties, and/or other sources.

The voice portal can receive dual-tone multi-frequency (DTMF or touch-tone) commands as well as spoken commands to further control the content presented and direct commerce transactions as well as the manner of presentation. The term audio request, or input, is used to refer to either a voice or touch-tone input, or a combination of the two types of input.

Embodiments of the invention can use telephone identifying information to personalize caller interactions with the voice portal. This allows the system to present highly customized information to each caller based on a personal profile the system associates with the telephone identifying information. Additionally, since a single user can access the voice portal from a number of telephones, embodiments of the invention may construct user profiles that allow the telephone identifying information from multiple telephones to be associated with a single user profile. In some embodiments, the telephone identifying information may be used to access authenticating information from a user profile for provision to an IM service, e.g. the IM service username and password might be stored in the user profile.

The invention will be described in greater detail as follows. First, a number of definitions useful to understanding the invention are presented. Then, the hardware and software architecture for one embodiment of a voice portal presented. Next, features provided by embodiments of the invention are discussed in greater detail.

B. Definitions

1. Telephone Identifying Information

For the purposes of this application, the term telephone identifying information will be used to refer to ANI information, CID information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone, e.g. wireless, pay phone, and/or hospital phone.

Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information as shown and described more fully in connection with FIGS. 3 and 4. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Add to my favorites", "Remember this", "Bookmark it", "shortcut this", pound (#) key touch-tone, etc., or through adjustments to the user profile made through the web interface using a computer.

Additionally, the user profile provides a useful mechanism for associating telephone identifying information with a single user, or entity. For example, Jane Doe may have a home phone, a work phone, a cell phone, and/or some other telephones. Suitable telephone identifying information for each of those phones can be associated in a single profile for Jane. This allows the system to provide uniformity of customization to a single user, irrespective of where they are calling from.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Cookie

The term cookie, as used herein, refers to a structured data element formatted according to the general principles of IETF RFC 2109 and/or some other state management standard.

A brief review of RFC 2109 may be useful. The core structure of a cookie is a name-value pair. The name is a token for identifying the cookie, e.g. "Customer", and the value is the value of that corresponding token, e.g. "Jane Doe".

Implicitly, each cookie is associated with a sending domain on the World Wide Web. According to RFC 2109, the implicitly set domain is the originating domain to which an HTTP request was sent. For example, if an HTTP GET request is sent to the request host "www.example.com", then the cookie set in response to that request would be implicitly associated with "www.example.com"

Additionally, a number of optional fields can be set, for example: a different domain for which the cookie is valid (Domain); a time to live (Max-Age); a version string (Version); etc. The phrases in parenthesis correspond to the RFC 2109 standard field names for the options.

5. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

6. Locale

As used in this application, the term locale refers to any geographic area. The geographic area may be a neighborhood, a city, a county, a metropolitan region, a state, a country, a continent, a group of countries, and/or some other collection of one or more geographic areas, e.g. all United State major metropolitan areas.

For this reason, a single user of the system may be considered to be in several locales. For example, a caller from Palo Alto, Calif., might be in the Palo Alto locale, a Silicon Valley locale, a San Francisco Bay Area locale, a Northern California locale, a California state locale, and a United States locale.

Thus, the telephone identifying information for a single telephone number can be mapped to a number of system-defined locales.

C. System Overview

First, the hardware and software architecture of a system including an embodiment of the invention will be described with reference to FIG. 3. FIG. 3 illustrates a system including embodiments of the invention used to provide IM services to users of telephones. The system of FIG. 3 can be used to allow users of standard telephones and wireless telephones to access a voice portal.

The following lists the elements of FIG. 3 and describes their interconnections. FIG. 3 includes a telephone 300, a wireless telephone 301, a computer 302, a telephone network 304, an Internet 306, a telephone gateway 307, an IM server 308, and a voice portal 310. The wireless telephone 301 and the telephone 300 are coupled in communication with the telephone network 304. The telephone network 304 is coupled in communication with the telephone gateway 307. The telephone gateway 307 is coupled in communication with the voice portal 310. The computer 302 is coupled in communication with the Internet 306. The Internet 306 is coupled in communication with the web server 308. The voice portal 310 and the web server 308 are coupled in communication with the shared database 312.

The following describes each of the elements of FIG. 3 in greater detail. The use of each of the elements will be described further in conjunction with the sections describing the personalization features.

The telephone 300 and the wireless telephone 301 are two different telephone interfaces to the voice portal 310. The telephone 300 and the wireless telephone 301 may be any sort of telephone and/or wireless telephone. For example the telephone 300, or the wireless telephone 301, may be a land line phone, a PBX telephone, a satellite phone, a wireless telephone, and/or any other type of communication device capable of providing voice communication and/or touch-tone signals over the telephone network 304. However, any audio signal carrying interface could be used.

The telephone network 304 may be the public switched telephone network (PSTN) and/or some other type of telephone network. For example, some embodiments of the invention may allow users with a voice over Internet Protocol (IP) phone to access the voice portal 310. The telephone network 304 is coupled to the telephone gateway 307 that allows the voice communications and/or touch-tone signals from the telephone network 304 to reach the voice portal 310 in usable form. Similarly, the telephone gateway 307 allows audio signals generated by the voice portal 310 to be sent over the telephone network 304 to respective telephones, e.g. the telephone 300. The telephone network 304 generally represents an audio signal carrying network.

The computer 302 is a computer such as a personal computer, a thin client computer, a server computer, a handheld computer, a set top box computer, and/or some other type of visual web browsing device. The computer 302 is coupled in communication with the Internet 306, e.g. by a dial-up connection, a digital subscriber loop (DSL), a cable modem, and/or some other type of connection. This allows the computer 302 to communicate with the IM server 308. The computer 302 typically provides a visual interface to the WWW and the IM service, by way of IM server 308, using web browsing software and IM software such as Internet Explorer(™) from Microsoft Corporation, Redmond, Wash., and AIM.

Additional information regarding voice portal 310 and various components interfacing with voice portal 310 are discussed in further detail in U.S. patent application Ser. No. 09/426,102, entitled "Method and Apparatus for Electronic Commerce Using a Telephone Interface", filed on 22 Oct. 1999, which is incorporated by reference herein.

D. Instant Messaging Functionality

Overview

First the usage scenarios are considered. Then, the basic changes to the voice portal 310 to support IM functionality will be discussed. Finally, the process flow/implementation for those scenarios is described.

Usage Scenarios

It is helpful to understand how the IM functionality will be made available to users of the voice portal 310 by considering a few usage scenarios. The usage scenarios can easily be divided into two primary categories: initiating and receiving. In terms of initiating messages four primary sub-areas can be identified: (1) determining if user X is online; (2) sending text and/or voice messages to a user; (3) retrieving stored messages (if supported by underlying IM service); and (4) getting information, e.g. user info, etc. From the receiving side there are four similar issues: (1) registering your presence on the phone with the IM service; (2) receiving notification of messages; (3) allowing participating in messaging; (4) posting information/registering. These usage scenarios dovetail nicely into the implementation issues.

Platform Changes

The voice portal 310 includes one or more programs for interpreting voice applications, e.g. VoiceXML (or VXML) programs, colloquially these programs for running VXML programs for multiple phone users together with the associated functionalities are sometimes referred to as the "platform". Although some shared messaging capabilities may have been available through the platform and voice portal 310 through dedicated applications, those features were application specific, e.g. message board, chat room (voice based user discussion), etc. In some embodiments, those specialized features can be generalized (and implemented) through the instant messaging functionality, e.g. channel features of an IM service.

The platform in normal operation supports the execution of a single VXML application per user. For example, if the user is accessing weather information using a weather application, e.g. weather.vxml, then only that application would be running. The platform can be modified to support concurrent execution of multiple programs for users, for example both the weather application and, in the "background", an instant messaging application. Additionally, mechanisms for switching between running applications must be provided, this mechanism should allow preservation of state (where the user is, variables, dialogue point, etc.) when the user switches applications, e.g. to respond to an instant message or send an instant message. Similarly, one or more "universal" commands, dual-tone multi-frequency (DTMF), or switch hook signals, may be provided to switch the running application. For example, in one embodiment, the word "Message" might be recognized to switch to the messaging application while preserving state in the other application.

According to some embodiments, the voice portal 310 allows users to control their experience. The system reacts to commands the user says (or doesn't say in the allotted time) in a synchronous fashion. Since incoming messages may come at any time the voice portal 310 may also provide an asynchronous notification mechanism, e.g. a distinctive tone or beep, to alert the user to switch to messaging mode.

These underlying architectural changes will be made clearer in the following discussion.

Implementations

The implementations will be discussed in greater detail with reference to FIGS. 4–9.

1. Is a User Online?

Figure 4:
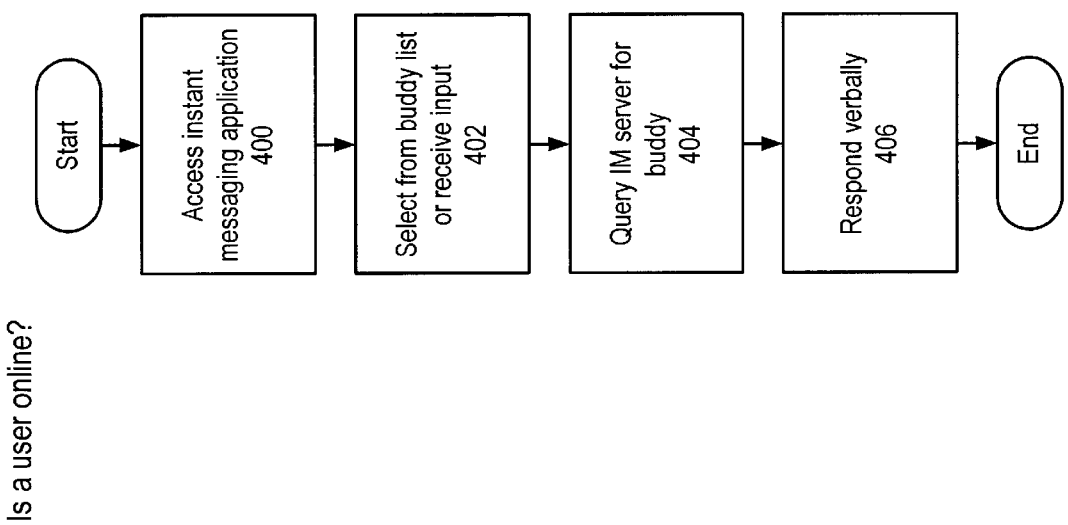
FIG. 4 is a process flow diagram for determining whether another user is online in the instant messaging (IM) service.

FIG. 4 is a process flow diagram for determining whether another user is online in the instant messaging (IM) service. This could be used by a user to learn which of her/his buddies are signed into the IM service, learn if a specifically designated user is signed in, etc.

At step 400, the user accesses the instant messaging application. This may be accomplished by providing a signal over the telephone interface to the voice portal 310. In some embodiments of the invention, a keyword such as "Instant Messanger" or "Messenger" is provided to allow access to IM functionality within specific locations, e.g. main menu, of the voice portal 310. Additionally, in some embodiments one or more universal commands are provided, e.g. "*IM" (e.g., key press on "*" followed by "4" followed by "6" on United States-style telephones) or one or more keywords. A universal command would typically be available in most, if not all, running applications contexts. In some embodiments, when a universal command is provided to the voice portal 310, the presently running application is suspended (and its state saved) until the user exits from the IM application. In some embodiments, the same universal command is used to toggle between the IM application and the other presently running application, e.g. "**", "##". "00", "*IM", etc. According to this embodiment, the user can easily switch back and forth between the IM functionalities and her/his other activities on the voice portal 310.

Next, at step 402, an IM user is selected from the caller's buddy list (as maintained on the voice portal 310 or on the IM server 308) or by direct entry of the username(s). According to some embodiments, the IM user name may be entered using a voice keyboard technique as described in U.S. patent application Ser. No. 09/655,277 entitled "Method and Apparatus for Voice Keyboard" filed 5 Sep. 2000, and assigned to the assignee of the present application. The user may be able to query for a list of available users from the buddy list with a spoken command and the name of a buddy e.g. "Who's online", "Buddy1", etc.

Next, at step 404, the voice portal 310 sends one or more queries to the IM server 308 to obtain the request information about the selected IM user(s). For example, according to some embodiments the IM service is implemented using one or more IM application protocols on top of a TCP/IP implementation. In such an embodiment, the voice portal 310 will generate suitable query packets according to the IM application protocols and send them over the Internet 306 to the IM server 308 for a query response. In some implementations of 308 the IM server will have already told the voice portal 310 of the presence of buddies already on the list and the voice portal 310 can check against a local data store.

Finally, at step 406, the voice portal 310 receives and decodes the IM application protocol packets received in response to its query or gets the result from its local data store and plays back information to the caller verbally. For example, if the caller at step 402 asked if "Buddy1" was online, then at step 406, the voice portal 310 would playback a human understandable version of the query results, e.g. "Buddy1 is presently online, but is away" or "Buddy1 is not logged in", etc.

2. Initiating Messaging

Figure 5:
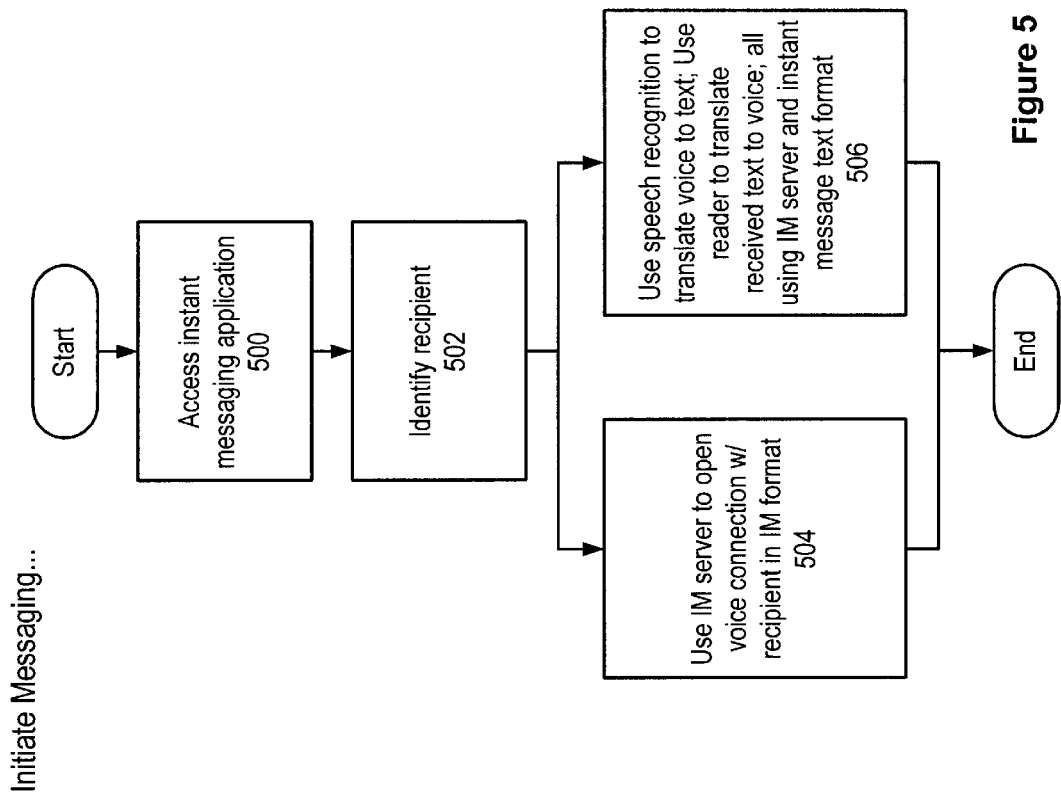
FIG. 5 is a process flow diagram for initiating and sending an IM.

FIG. 5 is a process flow diagram for initiating and sending an IM. This could be used for example after the process of FIG. 4 (or in conjunction with the process of FIG. 4) to send a message to a logged in user. In the case that the particular IM service supports stored messages, then the process of FIG. 5 could be used to send stored messages as well.

First, at step 500, the caller to the voice portal 310 accesses the IM application. This process can be done as in step 400.

Next, at step 502, the caller identifies one or more recipients or, when supported by the underlying IM service, a chat room name. This can be done according to the process of step 402.

The process than branches to either step 504 or 506, though some embodiments may allow a caller to use steps 504 and 506 concurrently in the same IM session, may allow the user to select between step 504 and 506, or may automatically determine which of steps 504 and 506 are used based on the capabilities of the message recipient. In either case, the messaged buddy may not be available, e.g. because they just signed off, etc. In this case, the voice portal 310 can verbally tell the user that the message recipient was unavailable.

Use of step 504 requires that the underlying IM service offer a voice connection functionality. In this step, the voice portal 310 will send one or more requests to the IM server 308 to request initiation of a voice connection with the identified recipient, e.g. Buddy1. Typically, this may cause the EM server 308 to send one or more requests to the remote user, e.g. on their computer or perhaps logged into the IM service via the voice portal 310 on a different telephone. The IM software being used by Buddy1 may allow Buddy1 to select whether to allow the IM session, if approved, the connection will then be established (possibly through the IM server 308) between the IM software used by Buddy1 (e.g. the prior art AIM(™) client of FIG. 1) and the IM application executing on the voice portal 310. Once so connected, the caller and Buddy1 can talk over that connection with the IM application on the voice portal 310 translating the telephone audio into the IM voice protocol format (which may be a standard VoIP format) for transmission to the remote IM software client (and performing the reverse translation on received audio).

Step 506 in contrast is may used when the recipient cannot (or will not) accept, or their IM software or connection cannot support, voice communications. In this configuration, the underlying IM service text formats are used to send messages. Messages received from the remote user can be played back using text-to-speech (TTS), or similar technologies. Outgoing messages may be entered using speech recognition (limited quality for unrestricted natural language utterances with present generation voice recognition systems), using a voice keyboard (see above), recording of the audio and providing a text message including a hyperlink of the location with the recorded audio to the message recipient, or other technologies.

For example, due to limitations of present generation speech recognition systems, in some embodiments, the user is limited to sending short messages from a predetermined list as selected by voice, e.g. "Yes", "No", "Thanks", "Bye", "Hi", "Call me", etc. The messages could be selected based on most common messages sent across all users, the user's previous messages, e.g. as entered using a voice keyboard, and/or through some other selection criteria.

As with most instant messaging sessions, the process ends when the users are finished, in some embodiments one or more predetermined signals may be used to end the chat, e.g. "*END", saying "Stop", etc. According to some embodiments of the invention, the user is limited to sending messages to a predetermined number of other IM users simultaneously, e.g. one user according to some embodiments. This is a sensible limitation given the limited context provided by the telephone/voice user interface (VUI). In the prior art graphical user interface (GUI) clients (see FIG. 2), the user might have multiple windows to provide context. In contrast, on the telephone, audio cues and human memory are required to provide context, accordingly given that the caller may already be switching back and forth between their underlying voice portal 310 application (weather, traffic, etc.) and messaging, it is desirable to limit the number of simultaneous IM sessions. This is not a technical limitation of the system. For example an approach could be used to switch chats through repeated use of the universal command (e.g. "*IM") to round-robin through the saved application and IM sessions, e.g. Current App >Session 1 >Session 2 >etc. >Current App.

3. Retrieving Stored Instant Messages

Figure 6:
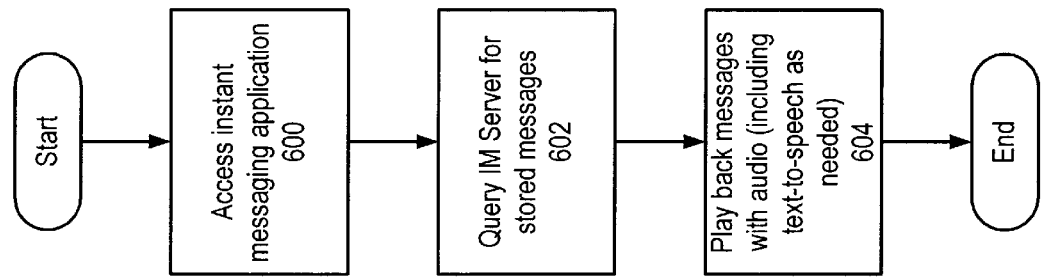
FIG. 6 is a process flow diagram for retrieving stored IMs.

FIG. 6 is a process flow diagram for retrieving stored IMs. This could be used by a caller to access stored messages that were sent by other IM service users. For example, if the caller's buddy "Buddy1" left a message, the caller could use this process to access that message.

First, at step 600, the caller accesses the instant messaging application as described above in connection with step 400. In some embodiments, prior to step 600, one or more auditory cues are provided to the caller to alert them to stored messages, e.g. short tones/beeps at start of call or audio message, e.g. ". . . Hi there, I notice that since you last called some people have left you instant messages, say 'Messages' to hear them . . . "

Next, at step 602, the IM server is queried for the stored messages, the query is sent according to the IM application protocol over the Internet 306 to the IM server 308.

After retrieval, at step 604, the messages are played back. In some embodiments, textual messages are translated into audio form using text-to-speech (TTS) or other technologies. In some embodiments, the caller is provided an opportunity to respond to each message in turn, e.g. queue a response (see steps 504 and 506, above) or directly message with the sender if she/he is online, for which an audio clue following the message may be provided "Buddy 1 is online right now, would you like to respond directly to them?" (see FIGS. 4 and 5 generally). When the caller has finished the playback, she/he may request deletion of the queued messages.

4. Obtaining User Information/Registering

Figure 7:
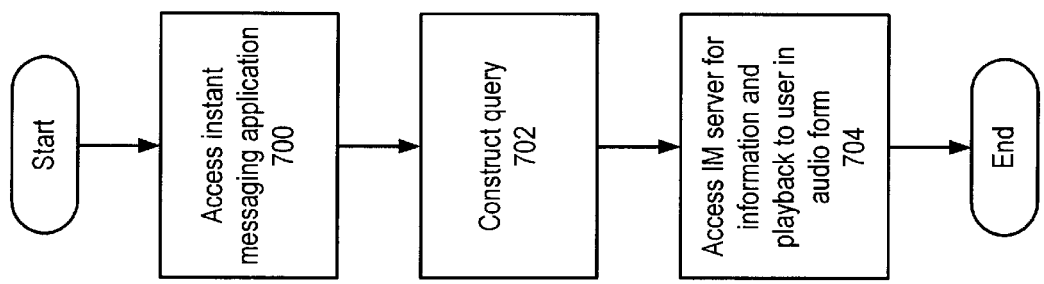
FIG. 7 is a process flow diagram for querying an IM server for information.

FIG. 7 is a process flow diagram for querying an IM server for information. This could be used to obtain information about IM service users, to register the caller with the IM service, and/or to provide other functionality.

The process starts at step 700, when the caller accesses access the instant messaging application as described above in connection with step 400. Next, at step 702, a query is constructed, e.g. caller requests info on IM user "Buddy1" or asks to sign up for the IM service. This process is conducted through a voice dialogue and is similar in many respects to the process of step 402, for example:

System (S): Welcome to the Messaging Service brought to you by <<Sponsor>>. Say a command or hang on while I tell you all the commands you can say . . .

Caller (C): [Interupting] Info.

S: Please use your touch tone keypad to enter the name of the user <<instructions optionally>>.

C: <<keys or speaks appropriately "Buddy1">>

S: Hang on while I get information on "Buddy1".

S: <<interlude for query part of step 704>>

S: Found it, "Buddy1" is <<query results>>

The set up of the voice dialogue can of course be varied based on the caller's experience (new callers might get more instruction) and common usage patterns. For example, when checking if someone is logged in (FIG. 4), it may be most common for callers to be looking for someone on their buddy list, in contrast when looking for information the callers may be more likely to query information for arbitrary users. As such, the dialogue is task appropriate with different prompt orders/input approaches.

Next, at step 704, the IM server 308 is accessed across the Internet 306 according to the IM application protocol to obtain the requested information. After retrieval, the results are played back to the user in audio form, see example dialogue above.

According to some embodiments of the invention, registration for the IM service can also be carried out according to the process of FIG. 7, an example follows:

S: . . . Hey this is your first time using Instant Messaging on the phone . . . Have you used <<Service Name's>> Instant messaging before.

C: No.

S: Okay, let's register you. After you are registered you will be able to send Instant Messages by phone.

S: I need you to pick a username for the service, this is the name that other users will use to identify you. <<Voice Keyboard instructions>>

C: <<keys or speaks appropriately "User1">>

S: Hang on, while I see if that username is available.

S: <<interlude for query part of step 704>>

S: . . . Sorry, "User1" is already being used, how about . . . <<suggestions if available or just tips>>

In some embodiments, if a caller registers for the service on the phone, she/he is not directly asked to provide an initial password. This eliminates the need to input such a password, instead a randomly generated password is used and stored in the caller's user profile on the voice portal 310. This stored password can be used by the voice portal 310 to authenticate the user. If this embodiment is used, then preferably, callers should be able to obtain, and modify, their password to allow access via prior art IM clients. (And also to allow callers update the password in their user profile on the voice portal if they change their password while using a prior art IM client.) Some implementations may transfer the user to an operator to register.

5. Registering a Phone User's Presence on the Instant Messaging Service

Figures 8, 9:
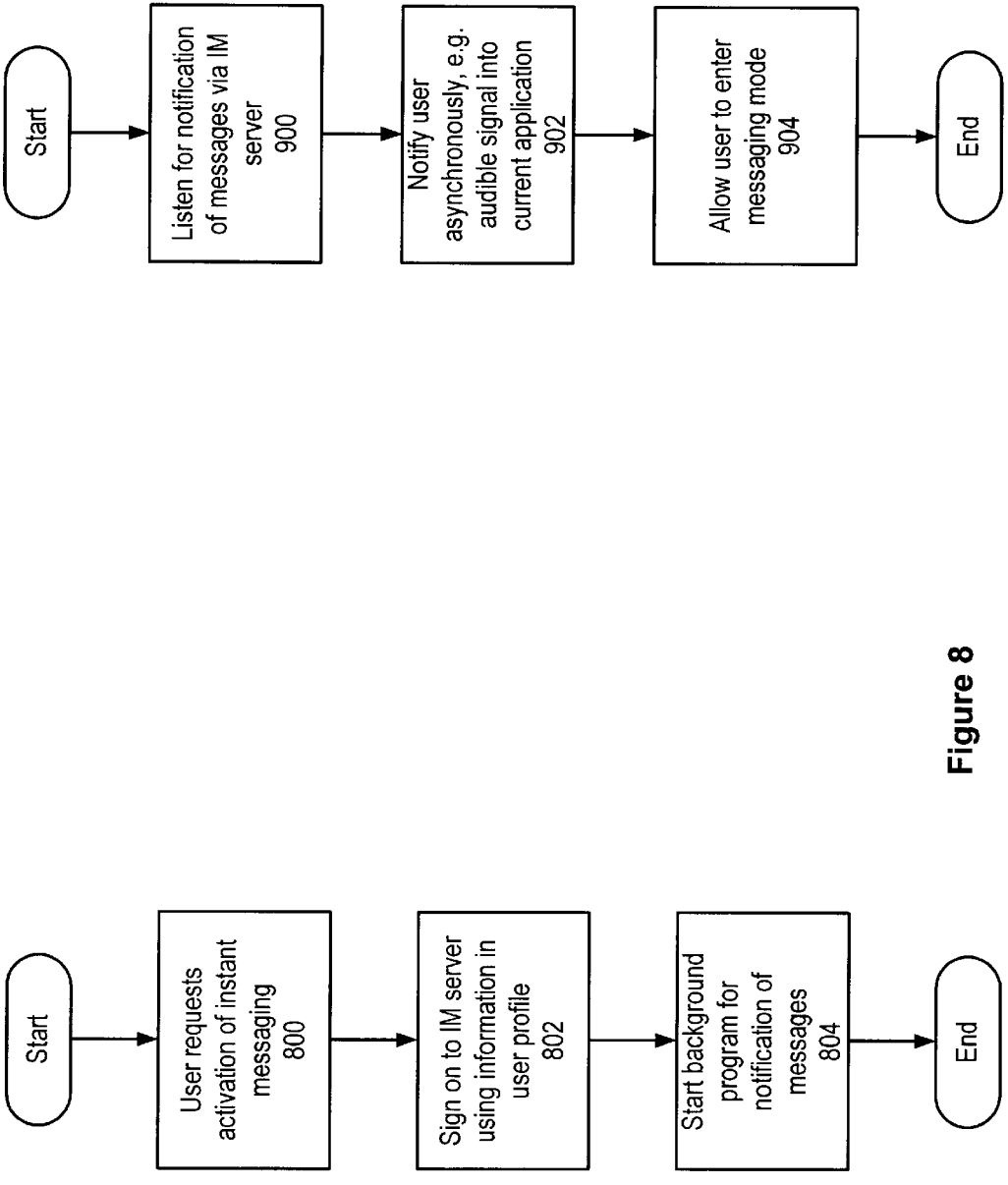
FIG. 8 is a process flow diagram for registering a telephone user's presence with an IM service.
FIG. 9 is a process flow diagram for asynchronous notification of incoming IMs.

FIG. 8 is a process flow diagram for registering a telephone user's presence with an IM service. This process can be used when a caller wishes to be "visible" on the IM service, e.g. to allow other IM service users to know she/he is online (see, e.g., prior art client of FIG. 1 showing that Buddy1 has registered their presence with the IM service and therefore is visible to User1).

First, at step 800, the caller explicitly, or implicitly, requests activation of IM functions for a particular call. According to some embodiments, if the caller can be identified from their telephone identifying information and their user profile indicates a preference to automatically go online, step 800 will occur automatically when the caller is connected to the voice portal 310. In other embodiments, the user might explicitly access the IM application (see step 400, above) and sign in, e.g. identify themselves to the voice portal 310, which in turn would allow their IM service username/password to be retrieved.

Next, at step 802, the information in the user profile maintained by the voice portal 310 is used to sign into the IM server 308. The voice portal 310 will then send messages according to the IM application protocol to the IM server 308 across the Internet 306 to sign the caller in. (The caller can be automatically signed out when the call ends.)

Any errors in the sign in can be handled with a voice dialogue: "Sorry, the IM server is down right now"; "Sorry, I can't log in, did you change your password recently?"; etc.

Additionally, users may be prompted control their privacy settings, e.g. which other IM users can, and cannot, see the user. Typical settings are: everyone and buddies only. Also, if supported by the IM server 308, the voice portal 310 can identify that the user is signed onto the IM service using a telephone interface. (IM users with a GUI client may see a specific icon to so indicate that fact.)

Once the user is logged in (and thus their presence is visible to other users of the IM service), a background program can be started in step 804. The background program may be an event handler, code module, and/or some other program, to listen for notification of messages via the IM server in the IM application protocol (see discussion of FIG. 9, below, for more details.)

6. Asynchronous Notification

FIG. 9 is a process flow diagram for asynchronous notification of incoming IMs. This process is provided implicitly by the voice portal 310 once callers have registered their presence, see discussion of FIG. 8, above. This process allows callers to become aware that someone is trying to send them an IM and respond to the same.

At step 900, a background program is listening for notification of messages (or possibly depending on the underlying IM application protocol, the messages themselves). In the parlance of Internet protocol (IP) networks using transmission control protocol (TCP), and the like, this background program is listening for one or more specially formatted packets containing relevant application data. In some embodiments, a single program operating on the voice portal 310 is listening for messages for multiple callers. In other embodiments, a separate program is executing for each caller. Other configurations are possible as appropriate.

At step 902, after a suitable packet has been identified, an asynchronous notification is inserted into the caller's current application. For example one or more tones or beeps might be generated. Similarly, playback of the current information could be paused so spoken voice could come through: "IM from <<sender>>".

At step 904, the voice portal 310 allows the user to enter directly into messaging mode (see steps 504 and 506), possibly through the use of the mechanism for accessing the IM application (see step 400). For example, after receiving the notification of step 902, the voice portal 310 might interpret the command "*IM" specially for a fixed period, e.g. 1–10 seconds, so that instead of switching to the normal instant message application menu (step 400), the caller is deposited directly into an IM session with the sender. In some embodiments, at that point the user hears the initial message. In other embodiments, the initial message is played as part of the asynchronous notification of step 902. In some embodiments, the user is offered a chance to accept the message, or not. Upon accepting, voice portal 310 may inform the sender, in an instant message, that the user is on a phone and that communication may be slow. In some embodiments, such an outgoing reply to message senders is a selectable user preference.

7. Miscellaneous

A number of other features of IM services may be offered through the voice portal. For example, in some embodiments, the voice portal 310 register's the user's presence (see discussion of FIG. 8, above) such that users of prior art clients are notified that the user is only accepting voice messages. In some embodiments, the voice portal 310 automatically responds to an IM with a textual response asking the initiator to use the IM service's voice functions to talk to the caller.

In some embodiments, callers to the voice portal 310 can turn the notification of step 902 on or off. In some embodiments, callers to the voice portal 310 can limit notification to those users on their buddy list.

In some embodiments, the voice portal 310 allows the user to import their buddy list from the IM server 308, their personal computer, a web page, an extensible markup language (XML) file, and/or a text file. In some embodiments, callers can construct a buddy list directly over the phone via the voice portal 310. In some embodiments, by accessing a web page associated with the voice portal 310, a caller can adjust their phone based buddy list and other IM related options.

E. Alternative Embodiments

Some embodiments of the invention support a mixture of a voice user interface (VUI) with a more traditional graphical user interface (GUI). For example, in some embodiments, if the caller is known to have a phone with display capabilities (e.g. Wireless Application Protocol (WAP), short messaging service (SMS), etc.) those capabilities may be leveraged as well, e.g. IMs might be displayed on the phone's display. In some embodiments, this is accomplished by causing the programs to send one or more appropriate messages over the Internet 306 (or other appropriate network) to the cell phone device in the appropriate format.

In these configurations, it is possible that step 506 (for example) and other user input steps might also support receipt of the data as entered and submitted from the phone (e.g. if the phone supports data input). In other embodiments, once the voice portal 310 has sent the IM off to the phone, the entire IM session is then conducted using the phone (e.g. responses keyed directly into phone without processing by voice portal 310). However, in these embodiments, the voice portal 310 can support the WAP application (or other type of application) responding to the data so that there is a relatively seamless caller experience.

F. Conclusion

In some embodiments, voice portal 310 can be hardware based, software based, or a combination of the two. In some embodiments, voice portal 310 and/or the IM functionality are comprised of one or more computer programs that are included in one or more computer usable media such as CD-ROMs, floppy disks, or other media. In some embodiments, call manager programs, execution engine programs, data connectivity engine programs, evaluation engine programs, streaming subsystem programs, recognition server programs, text to speech programs, and/or phone based IM functionality are included in one or more computer usable media.

Some embodiments of the invention are included in an electromagnetic wave form. The electromagnetic waveform comprises information such as call manager programs, execution engine programs, data connectivity engine programs, evaluation engine programs, streaming subsystem programs, recognition server programs, text to speech programs and/or phone based IM functionality. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A system for supporting access to an instant messaging service from a telephone over a network, the network supporting the instant messaging service, the system comprising:

a telephone interface, the telephone interface supporting transmission and receipt of audio from a telephone;

a computer system, the computer system coupled in communication with the telephone interface and the network, the computer system including:

a first program code for searching an availability list for a user requested by a telephone user, the availability list including users currently accessing the instant messaging service;

a second program code for verbally indicating to the telephone user whether a requested user is available;

a third program code for generating a first instant message from the telephone user to an available requested user;

a fourth program code for presenting content over the telephone interface to the telephone user;

a fifth program code for receiving a second instant message from a user over the network, wherein the user is one of the available requested user and another user on the availability list, and notifying the telephone user with an audio signal over the telephone interface of receipt of the second instant message during the presenting content; and a sixth program code for allowing the telephone user to respond to the second instant message over the telephone interface to the instant messaging service via the network.

2. The system of claim 1, wherein the computer system further includes a seventh program code for presenting the second instant message as audio over the telephone interface in response to an audio signal received over the telephone interface.

3. The system of claim 2, wherein the seventh program code further supports receipt of a second audio signal over the telephone interface and translation of the second audio signal into a format suitable for transmission to the user over the network using the instant messaging service.

4. A system for supporting access to an instant messaging service from a telephone over a network, the network supporting the instant messaging service, the system comprising:

a telephone interface, the telephone interface supporting transmission and receipt of audio from a telephone;

a computer system, the computer system coupled in communication with the telephone interface and the network, the computer system including:

a first program code for presenting content over the telephone interface to a telephone user;

a second program code for receiving an instant message from a sender over the network and notifying the telephone user with an audio signal over the telephone interface of receipt of the instant message during the presenting content;

a third program code for allowing the telephone user to respond to the instant message from the sender over the telephone interface to the instant messaging service via the network; and a fourth program code for presenting the instant message as audio over the telephone interface in response to an audio signal received over the telephone interface, and further supporting receipt of a second audio signal over the telephone interface and translation of the second audio signal into a format suitable for transmission to the sender over the network using the instant messaging service, wherein the format comprises text including a uniform resource locator (URL), the URL identifying a location where the second audio signal can be retrieved.

5. The system of claim 3, wherein the computer system further includes an eighth program code for performing speech recognition on an audio signal, and wherein the format comprises a text corresponding to the second audio signal, the text generated using the eighth program code.

6. A method of sending an instant message to an instant messaging service using a telephone interface, a computer system and a packet switched network, the method comprising:

receiving the instant message as an audio signal over the telephone interface on the computer system;

converting the instant message into a first format selected from the set of formats supported by the instant messenger service; and sending the instant message in the first format from the computer system to an instant messaging server over the packet switched network, wherein the first format includes a textual representation of the instant message generated from applying one or more speech recognition programs to the audio signal, further wherein the first format includes a uniform resource locator (URL), the URL corresponding to a location where the audio signal can be retrieved.

7. The method of claim 6, further comprising:

a second instant message from the requested user to the telephone caller, the second instant message including a textual message; and playing back the textual message to the telephone caller as an audio signal over the telephone interface using a text-to-speech process on the computer system.

* * * * *

UNITED STATES PATENT AND TRADEMARK OFFICE
CERTIFICATE OF CORRECTION

PATENT NO. : 6,757,365 B1  
DATED : June 29, 2004  
INVENTOR(S) : Travis A. Bogard It is certified that error appears in the above-identified patent and that said Letters Patent is hereby corrected as shown below:

Column 2,  
Line 25, delete "Notably, the IM functionality changes the general".

Column 14,  
Line 51, insert -- receiving -- before "a second instant message".

Signed and Sealed this

Thirty-first Day of August, 2004

JON W. DUDAS  
*Director of the United States Patent and Trademark Office*